United States Patent [19]

Myburgh

[11] Patent Number: 4,583,777
[45] Date of Patent: Apr. 22, 1986

[54] RETRACTABLE COVER

[76] Inventor: Hermanus L. J. Myburgh, P.O. Box 40268, Arcadia 0007, South Africa

[21] Appl. No.: 578,512

[22] Filed: Feb. 9, 1984

[51] Int. Cl.$^4$ ............................................. B60J 7/06
[52] U.S. Cl. ..................................... 296/100; 296/105
[58] Field of Search ...................... 296/100, 105, 104; 105/377

[56] References Cited

U.S. PATENT DOCUMENTS

| | | | |
|---|---|---|---|
| 3,298,732 | 1/1967 | Openshaw | 296/105 |
| 3,433,470 | 3/1969 | Erke | 296/100 |
| 4,189,178 | 2/1980 | Cramaro | 296/100 |
| 4,252,363 | 2/1981 | Rodrigue | 296/100 |
| 4,285,539 | 8/1981 | Cole | 296/100 |
| 4,289,346 | 9/1981 | Bourgeois | 296/100 |

Primary Examiner—Robert R. Song
Attorney, Agent, or Firm—Ladas & Parry

[57] ABSTRACT

This invention relates to a retractable cover system and, in particular, to such a cover system for use on truck load bodies. Retractable cover systems are known, the most simple being tent-like structures in which a fabric cover is loosely located over a framework. More complicated systems are also known in which substantially rigid cover shells are provided which are then hinged for movement between the open and closed positions. This invention provides a cover system which combines the simplicity of tent-like structures with the ease of use of the more complicated systems described above. The cover system of the invention comprises, in combination, a flexible sheet material cover and a structural framework defining the volume to be covered, the framework including a fixed frame rigidly supporting a track and a movable frame constituted by at least one transversely extending spreader movably supported on the track, the cover being adapted for location over the frame structure with one end thereof adapted for retention on the fixed frame and at least an opposite end thereof adapted for retention on the movable frame.

10 Claims, 6 Drawing Figures

FIG_1

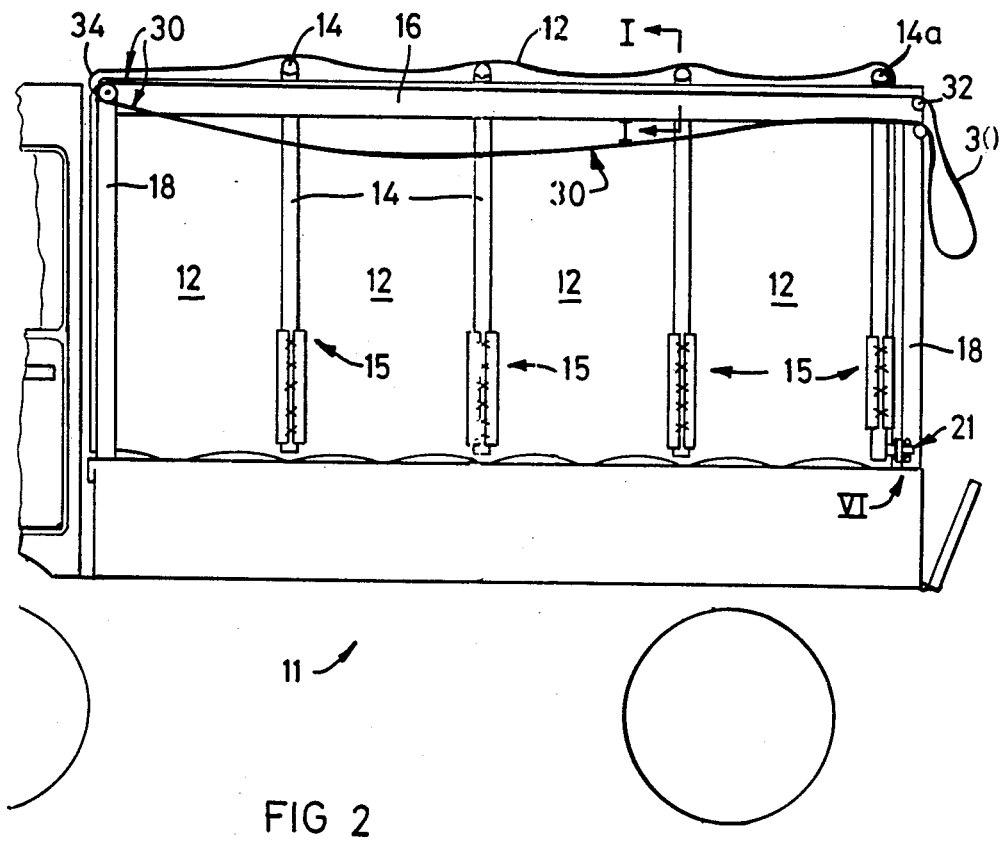
FIG 2
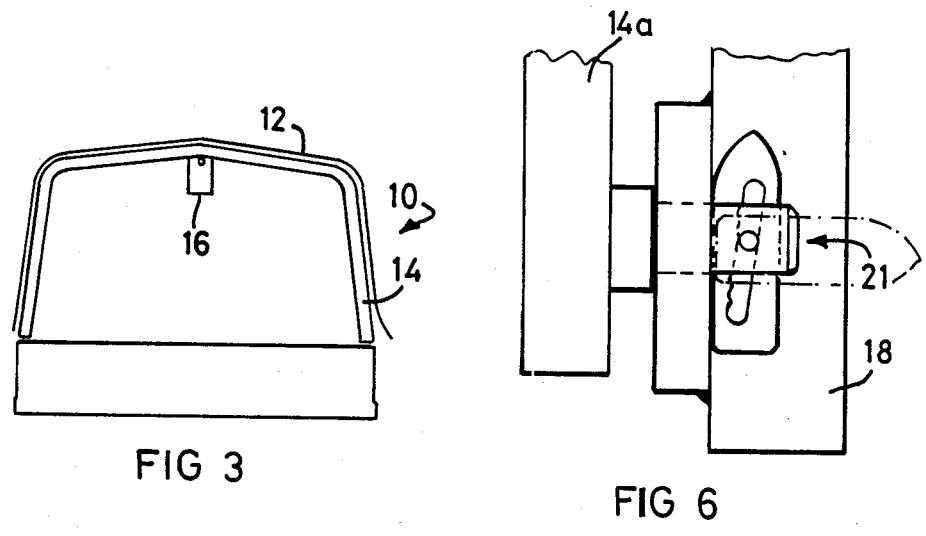
FIG 3
FIG 6

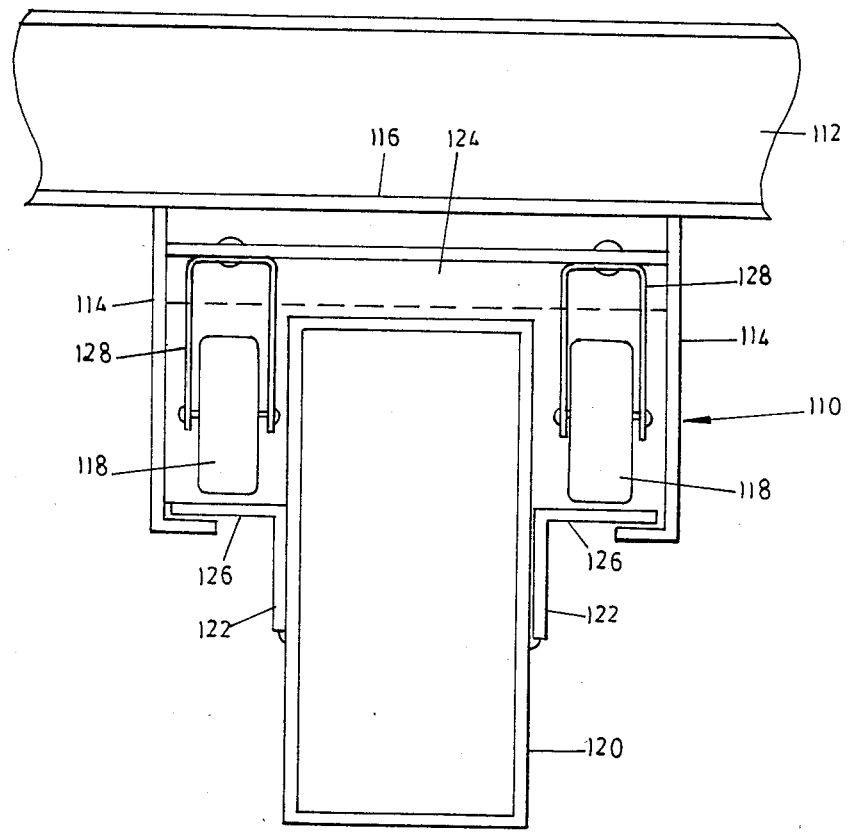
FIG_4
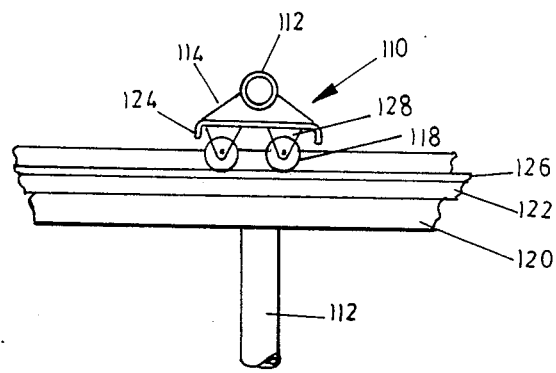
FIG_5

RETRACTABLE COVER

This invention relates to a retractable cover system and, in particular, to such a cover system for use on truck load bodies.

Retractable cover systems are known, the most simple being tent-like structures in which a fabric cover is loosely located over a framework. Such simple cover structures are used on truck load bodies and comprise a frame rigidly mounted on the load body with a fabric cover which may be drawn over the frame or retracted, depending on the requirements. These systems suffer from the disadvantage that the frame, which remains in position when the cover is retracted, hampers loading and unloading of the load body while the cover material, in the folded or retracted position, may suffer damage during travelling.

More complicated systems are also known in which substantially rigid cover shells are provided which are then hinged for movement between the open and closed positions. Alternatively, substantially rigid covers are known which include sides which are openable by means of roll-up covers, doors or the like. It will be appreciated that all these systems, while often performing satisfactorily, are complex and therefore expensive.

It is an object of this invention to provide a simple, yet effective, cover system or structure which combines the simplicity of tent-like structures with the ease of use of the more complicated systems described above.

According to the invention a cover system comprises, in combination, a flexible sheet material cover and a structural framework defining the volume to be covered, the framework including a fixed frame rigidly supporting a track and a movable frame constituted by at least one transversely extending spreader movably supported on the track, the cover being adapted for location over the frame structure with one end thereof adapted for retention on the fixed frame and at least an opposite end thereof adapted for retention on the moveable frame.

The movable frame may include a plurality of transversely extending spreaders movable supported on the track, the cover being adapted for location over the frame structure with one end thereof adapted for retention on the fixed frame, an opposite end thereof adapted for retention on the spreader furthest from the retention end of the fixed frame and a plurality of positions intermediate the ends of the cover being adapted for retention on the intermediate spreaders.

In a first embodiment of the invention, the spreaders are adapted for sliding movement along the track, the spreaders and the track each being provided with complementary slide ways.

In a further form of the invention, the spreaders are suspended from the track by means of wheeled trucks, the track including a running surface for the wheels of the trucks.

In this form of the invention, each spreader truck may include a peripheral skirt extending towards the track, the edge of the skirt being clear of the track by a distance smaller than the average fold height of the material of the cover. In this way ingress of the cover material between the wheels of the trucks and the track, is prevented. The track and the sliding or rolling mechanisms of the spreaders may each be provided with complementary interengaging formations adapted to prevent vertical dislocation of the spreaders from the track.

The fixed frame may conveniently include a beam extending in the travel direction of the spreaders, a rolling surface for the truck wheels being provided by track elements mounted to extend longitudinally along two opposed sides of the beam, the trucks straddling the top of the beams with the wheels thereof engaging the track elements on either side of the beam, the trucks including a peripheral skirt each, the transvese edges of which extend downwardly to a position just clear of the top of the beam and the parallel edges of which extend downwardly below the track elements and terminating in a reflexed portion which is curved inwardly under the sides of the track elements to constitute retaining formations adapted to retain the trucks against vertical dislocation from the track.

The cover system includes a movement mechanism comprising a rope, calbe or the like looped around a pulley attached to either end of the track and, between the pulleys, to the outermost spreader of the movable framework. A cleat or the like may be provided to lock the outermost spreader of the movable frame in any desired position.

The invention extends to a retractable cover as described above which has been adapted for use on the load body of a lorry as well as to a lorry including such a retractable cover.

The invention is further described with reference to the accompanying drawings in which:

FIG. 2 is a diagramatic sectional side elevation of the cover system according to the invention, in position on the load body of a truck or lorry;

FIG. 3 is a diagramatic transverse section through the cover system of the invention in position on a truck load body;

FIG. 4 is a transverse section through the track mechanism of a retractable cover system according to a second embodiment of the invention;

FIG. 5 is a diagramataic sectional side elevation of the track mechanism of FIG. 4; and FIG. 6 shows a detailed side elevation of the anti-loose fastener at VI in FIG. 2.

Figure 1:
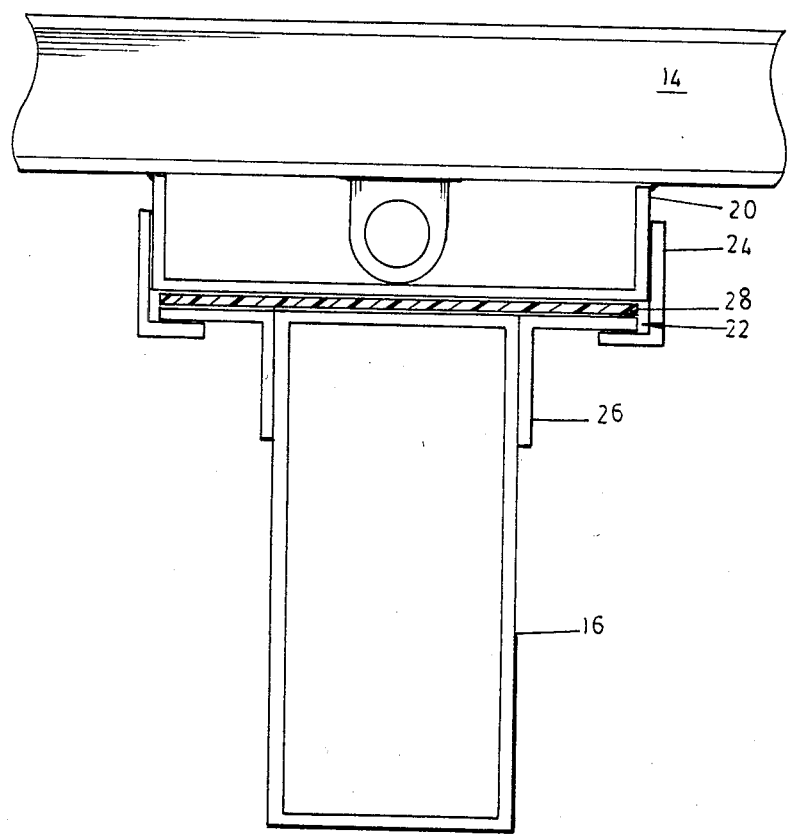
FIG. 1 is a transverse section at I—I in FIG. 2, through the track mechanism of a retractable cover system according to a first embodiment of the invention.

In the drawings, and with partifular reference to FIG. 3, the retractable cover system 10 of the invention is shown in use as a cover over lorry load body 11. The system 10 comprises a fabric cover 12 located over a plurality of transverse spreader ribs 14 which are slidably mounted on a beam 16 carrying a track for the spreaders or ribs 14 to move along. The longitudinally extending beam 16 is rigidly located on a pair of upright supports 18 of inverted U-shape secured to the load body 11, the beam and supports together forming a fixed frame on which the spreaders or the ribs 14 are suspended, the ribs constituting a movable framework which, together with the fixed frame, defines the volume to be covered. The sheet material is flexible and is adapted to follow the movement of the ribs 14 along the beam 16.

In FIG. 1, which is a section on line I—I in FIG. 2 but with cover 12 removed, it can be seen how each tubular rib 14 is welded to a cradle 20 provided with channel-like formations 22 by the connection thereto of a length of angle-iron 24 on either side of the cradle 20. The channel formations 22 are adapted to retain flange-like projections 26 constituted by the projection ends of of longitudinally extending lengths of angle iron welded to the upper ends of the beam 16.

The cradle 20 slides on the sliding surface provided by the top of the beam 16 and the tops of the flange-like projections 26, a low-friction skid pad 28 being interposed between the two sliding surfaces. The pad 28 is of a suitable plastics material and serves the purpose of reducing the friction between the sliding surfaces.

The movement mechanism of the cover comprises a rope 30 and pulley system, two pulleys 32 and 34 being provided on either end of the beam 16. An end of the rope 30 is connected to at least the outermost or leading rib 14a intermediate the pulleys 32 and 34. As will be seen from the description of the mechanism, it is not necessary to attach the rope 30 to all the ribs 14.

The cover is shown in FIG. 2 in the closed or almost completely closed position. To open the cover, the return part of the rope 30 is pulled, thereby exerting tension on the rear of the outermost or leading rib 14a to which the rope is connected and drawing this rib towards the pulley 34. The rib 14a, in being drawn in this direction, will urge all the other ribs in the same direction while the cover material 12 will move back in a series of folds. Once the ribs are located adjacent one another, or the desired open position has been reached, the ribs may be secured to one another and the cover material may be secured to the ribs by means of securing tapes or the like.

To close the cover 10, the rope 30 is drawn in the opposite direction, drawing the leading rib 14a outwardly in the direction of the pulley 32. Once the cover 10 is completely extended, the rib 14a can be secured to the upright 18 on this end of the load body by means of a cleat to secure the rope in this or any other position and anti-loose fasteners 21 located on the legs of the outer rib or spreader 14a. The top of the outermost spreader 14a is therefore retained by the tension of the rope and the base of the spreader 14a is retained by the anti-loose fasteners 21. The cover fabric 12 is secured to the intermediate ribs or spreaders 14 by pockets 15 sewn into the fabric cover at the appropriate positions into which the legs of the spreaders 14 are inserted. The tension exerted on the outermost rib 14a is translated to the remaining ribs 14 by the tension exerted on the fabric. In order to ensure the security of a load, reinforcing strips, cables or the like may be incorporated in the cover material in order to provide an armoured cover fabric.

The cover of the invention has the advantage that it is simple and easy to operate and it can be opened to any desired position intermediate the fully open or fully closed positions.

In the second embodiment, shown in FIGS. 4 and 5, the slide mechanism is replaced by a mechanism using wheeled trucks 110. In FIG. 4, which is a section similar to that of FIG. 1, each tubular rib 112 is welded to a cradle constituted by two side plates 114 of the truck 110. The upper plate 116 of the truck carries a set of four downwardly depending rollers or wheels 118, two on either side of a beam 120 extending in the travel direction of the trucks 110. A rolling surface for the wheels 118 is provided by welding two longitudinally extending lengths of angle-iron 122 to the sides of the beam 120, the upper surfaces of the angle-irons 122 constituting track elements with rolling surfaces for the wheels 118. The upper surface of the beam extends upwardly between the pairs of wheels so that the truck 110 straddles the beam 120 and the transversely extending edges of the upper plate 116 are curved downwardly to define a kind of a scraper 124 which terminates just above the upper surface of the beam 120. The scrapers 124 on either side of the upper plate and the side plates 114 define a dependent skirt for the truck 110, the side plates or parallel sides of the skirt extending downwardly below the flange-like projections 126 of the angle-irons 122 and being reflexed inwardly under the flange-like projections 126 to constitute retaining formations similar to those shown in FIG. 1. These retaining formations serve the purpose of retaining the spreaders 14, 112 against vertical dislocation from the beam 16, 120. The transverse edges of the skirt, namely the scraper-like dependent portions 124 of the upper plate 116 clear the upper surface of the beam by a distance smaller than the fold curvature of the fabric cover, the fold curvature being the thickness, on the fold, of a folded piece of fabric making up the cover. Depending on the stiffness of the material, this thickness will vary. The purpose of the scraper-like portion 124 is to push any folds of material before it during movement of the trucks 110 and to prevent ingress of the cover material between the wheels 118.

The wheels 118 are mounted on the upper plate 116 by means of cradles 128 riveted to the upper plate 116, riveting ensuring easy removal and replacement of the wheels 118.

It will be appreciated that the above description is exemplary and that variations of the invention are possible. For instance more than one beam or s suspension system for the ribs may be used and an electric motor or a crank arrangement may be used instead of the pully system.

I claim:

1. A cover system comprising, in combination, a flexible sheet material cover and a structural framework defining the volume to be covered, the framework including a fixed frame adapted for fixed mounting on the load body of a lorry or truck and having in use a pair of longitudinally spaced upstanding supports for supporting a central elevated longitudinally disposed track; and a movable frame including at least one spreader longitudinally movably supported on and extending transversely on either side of the track, the cover being adapted for location over the frame structure with one end thereof adapted for retention on the fixed frame and at least an opposite end thereof adapted for retention on the movable frame.

2. A cover system according to claim 1, in which the track and the spreaders each include complementary interengaging formations adapted to prevent vertical dislocation of the spreaders from the track.

3. A cover system according to claim 1, in which the movable frame includes a plurality of spreaders arranged in series and longitudinally movable supported on and extending transversely on either side of the track, the cover being adapted for location over the frame structure with one end thereof adapted for retention on the fixed frame, an opposite end thereof adapted for retention on the spreader furthest from the retention end of the fixed frame and a plurality of positions intermediate the ends of the cover being adapted for retention on the intermediate spreaders.

4. A cover system according to claim 3, including a movement mechanism comprising means acting between the fixed frame and the movable frame to urge at least the outermost spreader of the movable frame to and from a position adjacent the outermost end of the track.

5. A cover system according to claim 3, including a movement mechanism comprising a rope, cable, or the like looped around pulleys at opposite ends of the track, and, attached between the pulleys to the outermost spreader of the movable framework.

6. A cover system according to claim 4, in which the spreaders are adapted for sliding movement along the track, the spreaders and the track each being provided with complementary slide ways.

7. A cover system according to claim 4, in which the spreaders are suspeneded from the track by means of wheeled trucks, the track including a running surface for the wheels of the trucks.

8. A cover system according to claim 7, in which each spreader truck includes a peripheral skirt extending towards the track, the edge of the skirt being clear of the track by a distance smaller than the average fold height of the material of the cover.

9. A cover system according to claim 7, in which the fixed frame includes a beam supported by the upstanding supports and providing, the track and extending longitudinally in the travel direction of the spreaders, the track having a rolling surface for the truck wheels provided by track elements mounted to extend longitudinally along two opposed sides of the beam, the trucks straddling the top of the beam with the wheels thereof engaging the track elements on either side of the beam, the trucks including a peripheral skirt each, the transverse edges of which extend downwardly to a position just clear of the top of the beam and the parallel edges of which extend downwardly below the track elements and terminating in a reflexed portion which is curved inwardly under the sides of the track element to constitute retaining formations adapted to retain the trucks against vertical dislocation from the track.

10. A cover system according to claim 3, in which the upstanding supports and the spreaders are of inverted U-shape, and in which the lower ends of the legs of the outermost spreader are secured to the legs of the upstanding support at the outermost end of the track by releasable anti-loose fasteners.

* * * * *